United States Patent
Yang et al.

(10) Patent No.: US 9,667,757 B2
(45) Date of Patent: May 30, 2017

(54) TRANSMITTING APPARATUS, RECEIVING APPARATUS, AND DATA PROCESSING METHOD THEREOF

(71) Applicant: SAMSUNG ELECTRONICS CO., LTD., Suwon-si (KR)

(72) Inventors: Hyun-koo Yang, Seoul (KR); Sung-hee Hwang, Suwon-si (KR); Hak-ju Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 262 days.

(21) Appl. No.: 14/163,280

(22) Filed: Jan. 24, 2014

(65) Prior Publication Data

US 2015/0049773 A1   Feb. 19, 2015

(30) Foreign Application Priority Data

Aug. 13, 2013   (KR) .................... 10-2013-0096061

(51) Int. Cl.
  *H04L 29/06*   (2006.01)
  *H04L 12/00*   (2006.01)
  *H04N 21/00*   (2011.01)
  *H04L 12/64*   (2006.01)
  (Continued)

(52) U.S. Cl.
  CPC ............. *H04L 69/22* (2013.01); *H04L 12/00* (2013.01); *H04L 12/6418* (2013.01); *H04L 65/00* (2013.01); *H04N 21/00* (2013.01); *H04N 21/6112* (2013.01); *H04N 21/643* (2013.01)

(58) Field of Classification Search
  None
  See application file for complete search history.

(56) References Cited

U.S. PATENT DOCUMENTS

| 6,912,251 B1 * | 6/2005 | Ward ............... H04N 21/23406 |
| | | 348/432.1 |
| 8,005,167 B2 | 8/2011 | Lee et al. |
| 9,167,281 B2 * | 10/2015 | Petrov ............. H04N 21/23608 |

(Continued)

FOREIGN PATENT DOCUMENTS

| FI | WO 2010142853 A1 * | 12/2010 | ........... H04L 1/0057 |
| WO | 2010/058884 A1 | 5/2010 | |

OTHER PUBLICATIONS

GSE: DVB-S2 Generic Stream IP Encapsulation Protocol Authors: Ulrik De Bie, Bernhard Collini-Nocker, Gorry Fairhurst, Alberto Ginesi, Axel Jahn, Rita Rinaldo, Oscar Del Rio.*

(Continued)

*Primary Examiner* — Hassan Kizou
*Assistant Examiner* — Deepa Belur
(74) *Attorney, Agent, or Firm* — Sughrue Mion, PLLC

(57) ABSTRACT

A data processing method of a transmitting apparatus includes generating a frame including at least one data packet, inserting, using the transmitting apparatus, a header including information associated with a data field occupied by the at least one data packet into the frame, and transmitting, to a receiving apparatus, the frame into which the header is inserted, wherein the information associated with the data field includes first information indicating whether a start byte of a first data packet is included in the data field and second information indicating whether an end byte of a last data packet is included in the data field.

18 Claims, 13 Drawing Sheets

(51) Int. Cl.
*H04N 21/61* (2011.01)
*H04N 21/643* (2011.01)

(56) References Cited

U.S. PATENT DOCUMENTS

| | | | |
|---|---|---|---|
| 2002/0057717 A1* | 5/2002 | Mallory | 370/503 |
| 2007/0186143 A1* | 8/2007 | Gubbi | H03M 13/1515 |
| | | | 714/776 |
| 2007/0230460 A1 | 10/2007 | Jeong et al. | |
| 2008/0317246 A1* | 12/2008 | Manders | H04N 5/783 |
| | | | 380/37 |
| 2009/0213853 A1* | 8/2009 | Kwon et al. | 370/389 |
| 2009/0307727 A1* | 12/2009 | Thesling | H04H 20/74 |
| | | | 725/63 |
| 2011/0044225 A1* | 2/2011 | Rinne | H04W 72/005 |
| | | | 370/312 |
| 2011/0103300 A1* | 5/2011 | Vare | H04N 21/6112 |
| | | | 370/328 |
| 2011/0173515 A1 | 7/2011 | Lee et al. | |
| 2011/0213681 A1* | 9/2011 | Shahid | G06Q 30/02 |
| | | | 705/27.1 |
| 2013/0195148 A1 | 8/2013 | Kim et al. | |
| 2013/0219431 A1* | 8/2013 | Hong et al. | 725/54 |
| 2013/0291046 A1* | 10/2013 | Ko et al. | 725/116 |
| 2015/0010018 A1* | 1/2015 | Yang | H04H 20/72 |
| | | | 370/474 |
| 2015/0156141 A1* | 6/2015 | Michael et al. | 370/312 |
| 2016/0352873 A1* | 12/2016 | Oh | H04L 69/22 |

OTHER PUBLICATIONS

ETSI TS 102 606 V1.1.1 (Oct. 2007) Digital Video Broadcasting (DVB); Generic Stream Encapsulation (GSE) Protocol.*
Search Report dated Nov. 17, 2014, issued by the International Searching Authority in counterpart International Application No. PCT/KR2014/007520.
Written Opinion dated Nov. 17, 2014, issued by the International Searching Authority in counterpart International Application No. PCT/KR2014/007520.

* cited by examiner

200

TRANSMITTING APPARATUS, RECEIVING APPARATUS, AND DATA PROCESSING METHOD THEREOF

CROSS-REFERENCE TO RELATED APPLICATIONS

This application claims priority from Korean Patent Application No. 10-2013-0096061, filed on Aug. 13, 2013, in the Korean Intellectual Property Office, the disclosure of which is incorporated herein by reference in its entirety.

BACKGROUND

1. Field

Apparatuses and methods consistent with the present disclosure relate to a transmitting apparatus, a receiving apparatus, and a data processing method thereof, and more particularly, to a transmitting apparatus, a receiving apparatus, and a data processing method thereof, for transmitting data in units of frames.

2. Description of the Related Art

According to digital broadcast technologies, various types of digital contents, for example, video and audio data, and so on are provided to an end user. A plurality of standards including a series of ATSC 1.0 and ATSC 2.0 standards developed by the Advanced Television Systems Committee (ATSC) association have been developed thus far. In addition to A/52 and A/53 available from http://www.atsc.org/, the ATSC digital TV (hereinafter, also referred to as "DVT") standards disclosed in various documents have been selected for terrestrial broadcast in various countries including America, Canada, and Korea.

Recently, the ATSC has begun to develop new standards known as ATSC 3.0 as a method for transferring data and TV content in real time or non-real time to a fixed device and a mobile device. As a portion of such development, the ATSC discloses the document "call for proposals (CFP)" (TG3-S2 Doc #023r20, "Call for Proposals For ATSC-3.0 PHYSICAL LAYER, A Terrestrial Broadcast Standard", ATSC Technology Group 3 (ATSC 3.0), Mar. 26, 2013), an objective of which is to identify technologies that are to be combined to generate a new physical layer of the ATSC 3.0 standard. The ATSC 3.0 should not require backward-compatibility with certain broadcast systems including ATSC 1.0 and ATSC 2.0.

DVB-S2, T2, C2, and so on as the European second-generation digital broadcast standard formulates content as a baseband frame (BBF), applies an error correction code to the BBF, and transmits the BBF. Here, the length of the BBF is determined according to the length K_fec of information of the error correction code.

The BBF includes a header, a data field, and a padding byte. The padding byte may be used to maintain the length of the BBF to K_fec and may also be used to transmit additional information.

In case of DVB-T2, for backward-compatibility with the DVB-S2, information that does not vary in units of BBFs is also included in the BBF header. However, this information is information regarding a PLP as a higher logical unit than the BBF, and thus, it is appropriate that the information is included in L1 signaling.

Thus, there is a need for a BBF that includes only information that varies in units of BBFs or information that varies in units of data packets included in a BBF for a next-generation broadcast system. Here, the information that varies in units of BBFs includes information for analyzing each component of the BBF.

SUMMARY

Exemplary embodiments of the present disclosure overcome the above disadvantages and other disadvantages not described above. Also, the present disclosure is not required to overcome the disadvantages described above, and an exemplary embodiment of the present disclosure may not overcome any of the problems described above.

The present disclosure provides a transmitting apparatus, a receiving apparatus, and a data processing method thereof, for reducing a ratio of data associated information in a frame to increase data transmission efficiency.

According to an aspect of the present disclosure, a data processing method of a transmitting apparatus includes generating a frame including at least one data packet, inserting a header including information associated with a data field occupied by the at least one data packet into the frame, and transmitting, the frame into which the header is inserted wherein the information associated with the data field includes first information indicating whether a start byte of a first data packet is included in the data field and second information indicating whether an end byte of a last data packet is included in the data field.

The information associated with the data field may further include third information indicating the number of data packets, and an end byte of the data packets is included in the data field.

The information associated with the data field may further include third information indicating a distance between the start byte of the data field and a start byte of a second data packet, and when the start byte of the first data packet is not included in the data field, the start byte of the second data packet is included in the data field.

The end byte of the last data packet is included in the data field when the start byte of the first data packet is included in the data field, and the information associated with the data field may further include third information indicating a distance between an end byte of the data field and the end byte of the last data packet.

The first information may be a flag value of 1 or 0 and the second information may be a flag value of 1 or 0.

According to another aspect of the present disclosure, a data processing method of a receiving apparatus for receiving and processing a frame including at least one data packet includes receiving a frame into which a header is inserted, the header includes information associated with a data field occupied by the at least one data packet, calculating a data field length based on the information, and processing the frame based on the calculated data field length, the information associated with the data field includes first information indicating whether a start byte of a first data packet is included in the data field and second information indicating whether an end byte of a last data packet is included in the data field.

In response to the first information indicating that the start byte of the first data packet is not included in the data field and the second information indicating that the end byte of the last data packet is not included in the data field, the calculating of the data field length may include calculating a difference between a length of the frame and a header region length.

The information associated with the data field may further include third information indicating the number of data packets, an end byte of the data packets is included in the data field, and in response to the first information indicating that the start byte of the first data packet is included in the data field and the second information indicating that the end byte of the last data packet is included in the data field, the calculating of the data field length the calculating of the data field length may include calculating a value obtained by multiplying the third information and the data packet length as the data field length when it is determined that a start byte of a first data packet is included in the data field and an end byte of a last data packet is included in the data field based on the first information and the second information.

The information associated with the data field may further include third information indicating a distance between the start byte of the data field and a start byte of a second data packet, when the start byte of the first data packet is not included in the data field, the start byte of the second data packet is included in the data field; and in response to the first information indicating that the start byte of the first data packet is not included in the data field and the second information indicating that the end byte of the last data packet is included in the data field, the calculating of the data field length comprises summing the third information with a first value, the first value being obtained by multiplying the data packet length with a value that is obtained by reducing the number of data packets by 1.

The information associated with the data field may further include third information indicating a distance between the end byte of the data field and the end byte of the last data packet among data packets, when the start byte of the first data packet is included in the data field, the end byte of the last data packet is included in the data field; and in response to the first information indicating that the start byte of the first data packet is included in the data field and the second information indicating that the end byte of a last data packet is not included in the data field, the calculating of the data field length may include summing the third information with a first value, the first value being obtained by multiplying the number of data packets in the data field and the data packet length.

According to another aspect of the present disclosure, a transmitting apparatus includes a frame generator configured to generate a frame including at least one data packet, an information inserter configured to insert a header including information associated with a data field occupied by the at least one data packet into the frame, and a transmitter configured to transmit the frame into which the header is inserted, wherein the information associated with the data field includes first information indicating whether a start byte of a first data packet is included in the data field and second information indicating whether an end byte of a last data packet is included in the data field.

The information associated with the data field may further include third information indicating the number of data packets, an end byte of the data packets is included in the data field.

The information associated with the data field may further include third information indicating a distance between the start byte of the data field and a start byte of a second data packet, when the start byte of the first data packet is not included in the data field, the start byte of the second data packet is included in the data field.

The information associated with the data field may further include third information indicating a distance between the end byte of the data field and the end byte of the last data packet among data packets, and when the start byte of the first data packet is included in the data field, the end byte of the last data packet is included in the data field.

The first information may be a flag value of 1 or 0 and the second information may be a flag value of 1 or 0.

According to another aspect of the present disclosure, a receiving apparatus for receiving and processing a frame including at least one data packet includes a receiver configured to receive a frame into which a header including information associated with a data field occupied by the at least one data packet is inserted, and a signal processor configured to calculate a data field length based on the information and to process the frame based on the calculated data field length, wherein the information associated with the data field includes first information indicating whether a start byte of a first data packet is included in the data field and second information indicating whether an end byte of a last data packet is included in the data field.

The signal processor may in response to the first information indicating that the start byte of the first data packet is not included in the data field and the second information indicating that the end byte of the last data packet is not included in the data field, calculate, as the data field length, a difference between the length of the frame and a header region length.

The information associated with the data field may further include third information indicating the number of data packets, an end byte of the data packets is included in the data field; and in response to the first information indicating that the start byte of the first data packet is included in the data field and the second information indicating that the end byte of the last data packet is included in the data, the signal processor may calculate, as the data field length, a value obtained by multiplying the third information and the data packet length.

The information associated with the data field may further include third information indicating a distance between the start byte of the data field and a start byte of a second data packet, when the start byte of the first data packet is not included in the data field, the start byte of third information is included in the data field; and in response to the first information indicating that the start byte of the first data packet is not included in the data field and the second information indicating that the end byte of the last data packet is included in the data field, the signal processor may calculate, as the data field length, a value obtained by summing the third information and a first value, the first value being obtained by multiplying the data packet length by a value that is obtained by reducing the number of data packets in the data field by 1.

The information associated with the data field may further include third information indicating a distance between the end byte of the data field and the end byte of the last data packet among data packets, when the start byte of the first data packet is included in the data field, the end byte of the data packets is included in the data field, and in response to the first information indicating that the start byte of the first data packet is included in the data field and the second information indicating that the end byte of the last data packet is not included in the data field, the signal processor may calculate, as the data field length, a value obtained by summing the third information with a first value, the first value being obtained by multiplying the third information and the data packet length.

According to the aforementioned exemplary embodiments of the present disclosure, data transmission efficiency is increased.

Additional and/or other aspects and advantages of the disclosure will be set forth in part in the description which follows and, in part, will be obvious from the description, or may be learned by practice of the disclosure.

BRIEF DESCRIPTION OF THE DRAWING FIGURES

The above and/or other aspects of the present disclosure will be more apparent by describing certain exemplary embodiments of the present disclosure with reference to the accompanying drawings, in which.

DETAILED DESCRIPTION

Certain exemplary embodiments of the present disclosure will now be described in greater detail with reference to the accompanying drawings.

Figure 1:
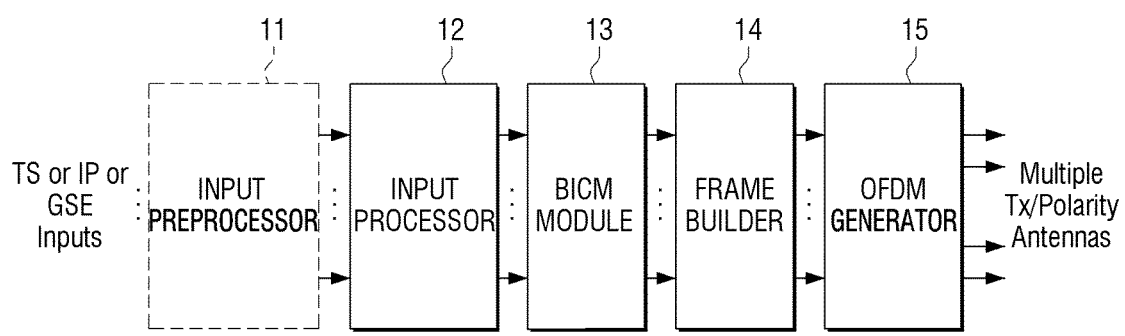
FIG. 1 is a diagram illustrating the configuration of a transmitting apparatus according to an exemplary embodiment of the present disclosure, for better understanding of the present disclosure.

FIG. 1 is a diagram illustrating the configuration of a transmitting apparatus 10 according to an exemplary embodiment of the present disclosure, for better understanding of the present disclosure.

The transmitting apparatus 10 illustrated in FIG. 1 conforms to a digital video broadcasting-terrestrial version 2 (DVB-T2) system, but is not limited thereto. However, for convenience of description, the technical features of the present disclosure will be described in terms of the DVB-T2 system.

Hereinafter, for better understanding of the present disclosure, a schematic configuration of the DVB-T2 system will be described.

Referring to FIG. 1, the transmitting apparatus 10 includes an input preprocessor 11, an input processor 12, a BICM module 13, a frame builder 14, and an OFDM generator 15.

An input stream input to the transmitting apparatus 10 may include at least one of an MPEG-TS stream, an Internet Protocol (IP) stream, and a general stream encapsulation (GSE) stream (or a GS stream).

The input preprocessor 11 receives at least one of an MPEG-TS stream, an IP stream, and a GSE stream and generates one or more PLPs in units of services (or in units of service components) for robustness.

The input processor 12 generates a baseband (BB) frame including the one or more PLPs generated by the input preprocessor 11. When the input processor 12 receives a PLP corresponding to a service, the input processor 12 may generate the BB frame by dividing the corresponding PLP into PLPs corresponding to service components.

The BICM module 13 adds redundancy to the output of the input processor 12 and performs interleaving in order to correct errors on a transmission channel.

A frame builder 14 maps a plurality of PLPs to a transmission frame in units of cells to complete a transmission frame structure.

The OFDM generator 15 OFDM modulates input data to generate a baseband signal to be transmitted to one or more antennas.

Figure 2A:
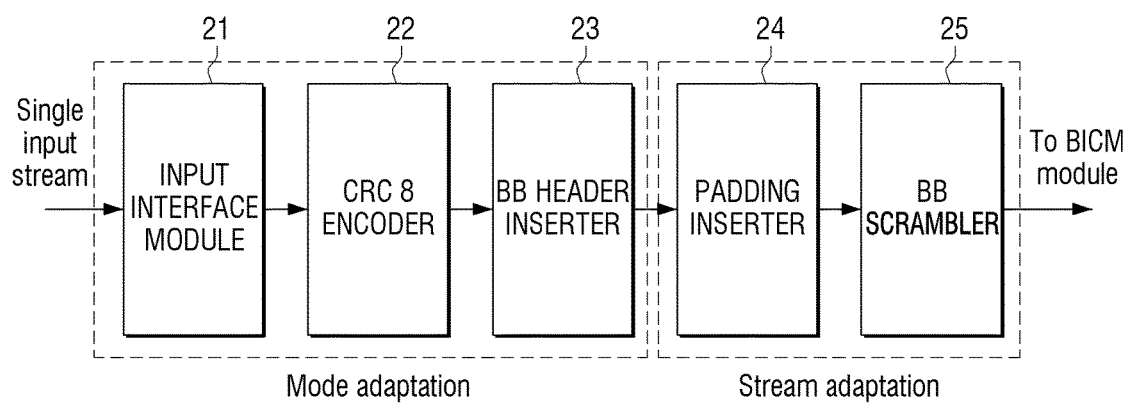
FIGS. 2A and 2B are diagrams illustrating the configurations of an input preprocessor illustrated in FIG. 1 according to various exemplary embodiments of the present disclosure.
Figure 2B:
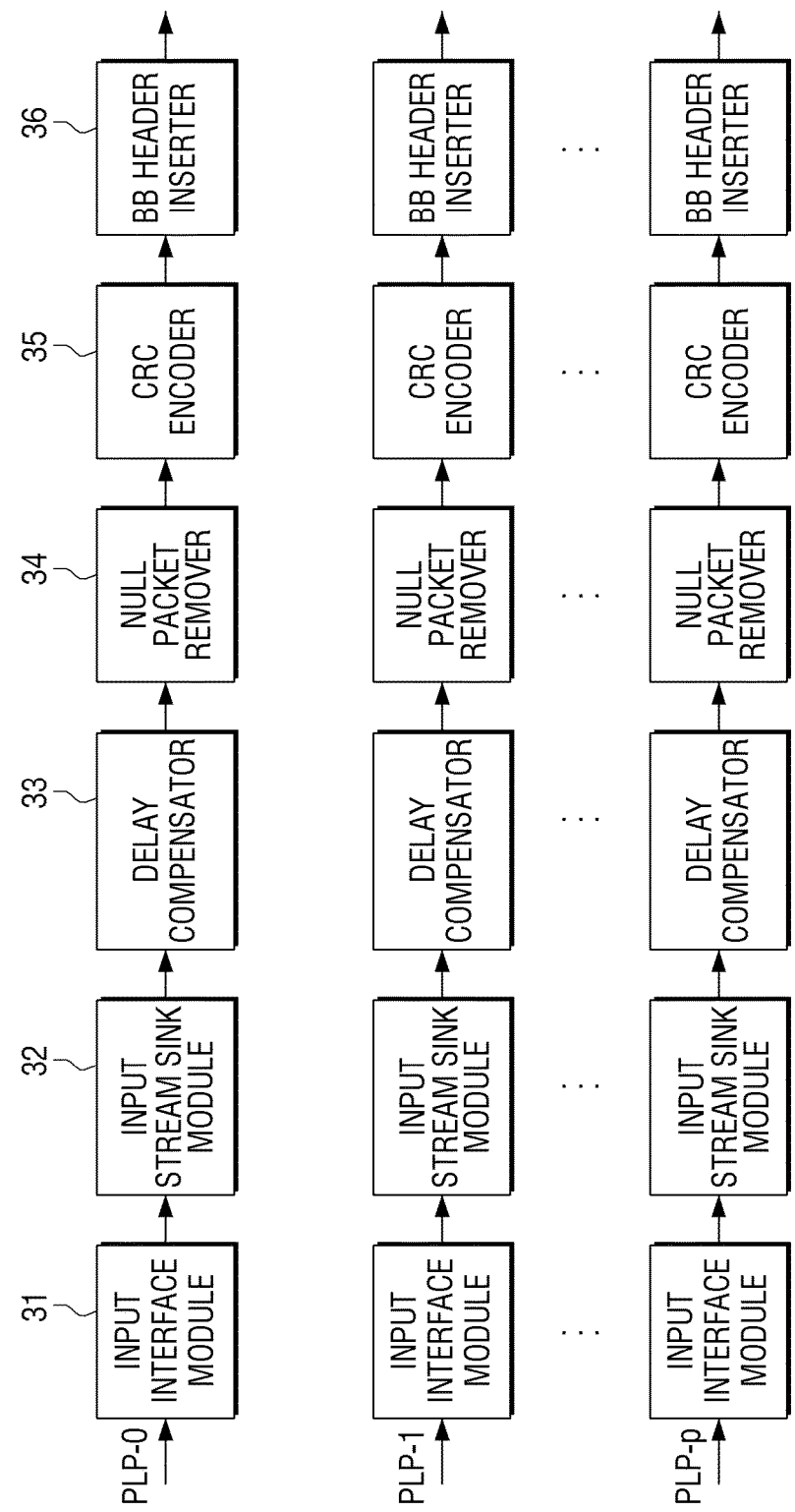

FIGS. 2A and 2B illustrate the configurations of the input preprocessor 11 illustrated in FIG. 1 according to various exemplary embodiments of the present disclosure.

A method according to exemplary embodiments of the present disclosure is performed by the input processor 11 illustrated in FIG. 1. Thus, the configuration of the input processor 11 will be described below in greater detail.

FIG. 2A illustrates the configuration of the input processor 11 in case of one input stream according to an exemplary embodiment of the present disclosure.

In case of one input stream, the input processor 11 may include an input interface module 21, a CRC-8 encoder 22, a BB header inserter 23, a padding inserter 24, and a BB scrambler 25. In FIG. 2A, for convenience of description, the input interface module 21, the CRC-8 encoder 22, and the BB header inserter 23 will be referred to as a mode adaptation module, and the padding inserter 24 and the BB scrambler 25 will be referred to as a stream adaptation module.

The input interface module 21 slices the input stream into a number of bits that is required to generate a BB frame, to generate the BB frame.

The CRC-8 encoder 22 performs CRC encoding on the BB frame. The BB header inserter 23 inserts a header with a fixed size into a front end of the CRC-encoded BB frame.

When a data amount of an input bit stream is less than an amount of a BB frame for FEC, the padding inserter 24 may insert a padding bit into the BB frame in order to form the BB frame.

The BB scrambler 25 exclusive OR (XOR)-calculates the bit stream of the BB frame in a pseudo random binary sequence (PRBS) to perform randomizing.

FIG. 2B illustrates a mode adaptation module of the input processor 11 in case of multi PLP input according to another exemplary embodiment of the present disclosure. Here, a PLP refers to a path of a signal that is independently processed. That is, each service (e.g., video, expanded video, audio, data stream, etc.) may be transmitted and received on a plurality of RF channels. In this regard, the PLP is a path for transmitting this service or a stream transmitted via the path. In addition, the PLP may be positioned in slots that are distributed at a temporal interval on a plurality of RF channels or may be distributed at a temporal interval on one RF channel. That is, one PLP may be distributed and transmitted at a temporal interval on one RF channel or a plurality of RF channels.

The mode adaptation module includes an input interface module 31, an input stream sink module 32, a delay compensator 33, a null packet remover 34, a CRC encoder 35, and a BB header inserter 36. Components related to exemplary embodiments of the present disclosure have been described in detail with reference to FIG. 2A, and thus, a detailed description of each component illustrated in FIG. 2B is not given.

Figure 3:
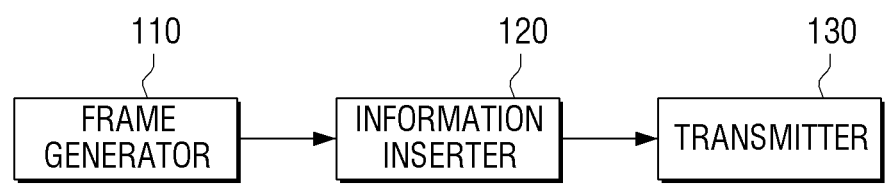
FIG. 3 is a block diagram of the configuration of a transmitting apparatus according to an exemplary embodiment of the present disclosure.

FIG. 3 is a block diagram of the configuration of a transmitting apparatus 100 according to an exemplary embodiment of the present disclosure.

Referring to FIG. 3, the transmitting apparatus 100 includes a frame generator 110, an information inserter 120, and a transmitter 130.

The transmitting apparatus 100 may transmit data to a receiving apparatus (not shown). The transmitted data includes at least service data that is provided to a fixed terminal and service data that is provided to a mobile terminal. Here, the fixed terminal may be, for example, a home smart TV or a set top box and the mobile terminal may be a smart phone.

The frame generator 110 generates a frame to be transmitted through the transmitting apparatus 100.

In detail, the frame generator 110 generates a frame including at least one data packet. Here, the frame may conform to the DVB-T2 standard.

For example, the frame generator 110 slices the input stream into a number of bits that is required to generate a BB frame, to generate the BB frame. Thus, the frame generator 110 may be implemented as input interface modules 21 and 31 but is not limited thereto.

The information inserter 120 inserts information associated with a data field (or a data field region) occupied by at least one data packet generated by the frame generator 110 into a frame.

For example, the information inserter 120 may include a header including information associated with the data field and having a fixed size into a front end of the BB frame. Thus, the information inserter 120 may be implemented as the aforementioned BB header inserters 23 and 36, but is not limited thereto.

Here, the information associated with the data field may be information for calculating the length of a data field for frame process in a receiving apparatus (not shown).

In detail, the information associated with the data field may include first information indicating whether a start byte of a first data packet is included in the data field and second information indicating whether an end byte of a last data packet is included in the data field. Here, the first data packet refers to a data packet to which byte information allocated to the start byte of the data field belongs. Similarly, the last data packet refers to a data packet to which byte information allocated to the end byte of the data field belongs.

The first information and the second information may be a flag value of 1 or 0 but is not limited thereto.

For example, when the start byte of the first data packet is included in the data field, the first information may have a flag value of "1", and when the start byte of the first data packet is not included in the data field, the first information may have a flag value of "0". In addition, when the end byte of the last data packet is included in the data field, the second information may have a flag value of "1", and when the end byte of the last data packet is not included in the data field, the second information may have a flag value of "0". Accordingly, the first information and the second information may each be represented in one-bit value.

In addition, the information associated with the data field may further include third information indicating the number of data packets, an end byte of which is included in the data field.

For example, when a maximum length of the data field is 8100 bytes (64,800 bits) and a data packet length is fixed to 188 bytes, the number of data packets included in the data field does not exceed 44, and thus, the third information may be represented in a 6-bit value indicating 26.

In addition, the information associated with the data field may further include first distance information indicating a distance between the start byte of the data field and a start byte of a second data packet, when the start byte of the first data packet is not included in the data field, the start byte of second data packet is included in the data field.

For example, when a data packet length is fixed to 188 bytes, the distance represented by the first distance information does not exceed 188 bytes as the data packet length, and thus, the first distance information may be represented by 8-bit value indicating a length of 28.

In addition, the information associated with the data field may further include second distance information indicating a distance between the end byte of the data field and the end byte of the last data packet among data packets, when the start byte of the first data packet is included in the data field, the end byte of the data packets is included in the data field. Here, the second distance information is the same as a value obtained by calculating, in a byte number, the length of a data packet included in the data field in a data packet, a start byte of the data packet is included in the data field and is not included in the data field.

For example, when a data packet length is fixed to 188 bytes, the distance represented by the second distance information does not exceed 188 bytes as the data packet length, and thus, the second distance information may be represented by 8-bit value indicating a length of 28.

The aforementioned first distance information and second distance information do not have to simultaneously be included in a value required for a specific case, and thus, the first distance information or the second distance information may be represented in 8-bit value.

Thus, the data field length may be represented using a much smaller byte value than that of a conventional method for representing the data field length in a bit value. A method of calculating a data field length using the aforementioned information will be described below with regard to a receiving apparatus.

The transmitter 130 transmits the frame generated by the frame generator 110 to a receiving apparatus (not shown). In this case, the transmitter 130 may be implemented as a transmitting antenna.

Figure 4:
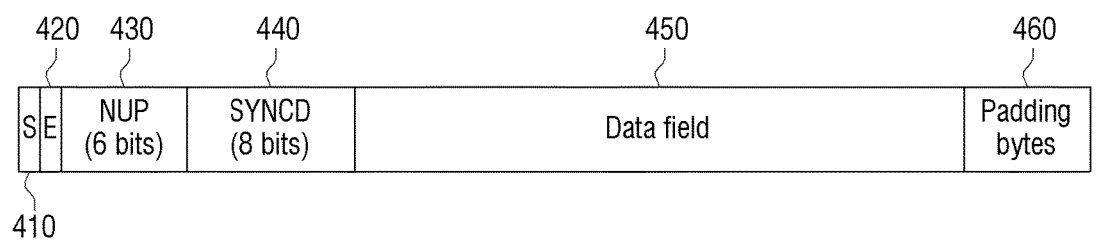
FIG. 4 is a diagram illustrating a frame format according to an exemplary embodiment of the present disclosure.

FIG. 4 is a diagram illustrating a frame format according to an exemplary embodiment of the present disclosure.

As illustrated in FIG. 4, a BB frame according to an exemplary embodiment of the present disclosure may include a start indicator S 410 indicating first information, an end indicator E 420 indicating second information, a number of user packets (NUP) 430 indicating third information, a SYNCD 440 indicating first distance and second distance information, a data field 450, and one or more padding bytes 460 (as necessary).

In the exemplary embodiment illustrated in FIG. 4, when the data packet length, for example, a TS packet length is fixed, the frame format will be described below.

As described above, the start indicator S 410 is information indicating whether the start byte of the first data packet is included in the data field. In addition, the start indicator S 410 may be represented in "1" or "0" and may be represented in 1 bit.

For example, when a frame transmits in-band signaling, the frame may be an interleaving frame or logical data unit defined in DVB-T2, and a start byte of a first data packet needs to be identical to the start byte of the data field based on the attribute of the corresponding frame, the start indicator S 410 may have a value "1".

The end indicator E 420 is information indicating whether the end byte of the last data packet is included in the data field. Similarly, the end indicator E 420 may be represented in "1" or "0" and may be represented in 1 bit.

For example, when sufficient data to generate the frame is not buffered in a TX buffer, a last data packet stored in the TX buffer needs to be included in the data field, and thus, the end byte of the last data packet is included in the data field, the end indicator E 420 may have "1".

The number of user packets (NUP) 430 is information indicating the number of data packets, the end byte of the data packets is included in the data field. When the data packet length is fixed, a bit number is required such that the number of user packets (NUP) 430 calculated by dividing a data field maximum length by a data packet length may be represented. For example, when the data field maximum length is 8100 bytes and the data packet length is fixed to 188 bytes, the number of data packets included in the data field does not exceed 44, and thus, the number of user packets (NUP) 430 may be represented in 6 bits representing 26.

When the start indicator S 410 and the end indicator E 420 are each 0, the number of user packets (NUP) 430 may be reserved.

The SYNCD 440 is information for indicating a distance between the start byte of the data field and a start byte of a second data packet, when the start byte of the first data packet is not included in the data field, the start byte of the second data packet is included in the data field. The SYNCD 440 may also indicate a distance between the end byte of the data field and the end byte of the last data packet among data packets, when the start byte of the first data packet is included in the data field, the end byte of the data packets is included in the data field. In addition, the SYNCD 440 does not exceed the maximum data packet length when the data packet length is fixed, and thus, a bit number is required to represent the data packet length. For example, when the data packet length is fixed to 188 bytes, the SYNCD 440 may be represented in 8 bits indicating a length of 28.

When the start indicator S 410 and the end indicator E 420 are each 1, the SYNCD 440 may be omitted.

Figure 5A:
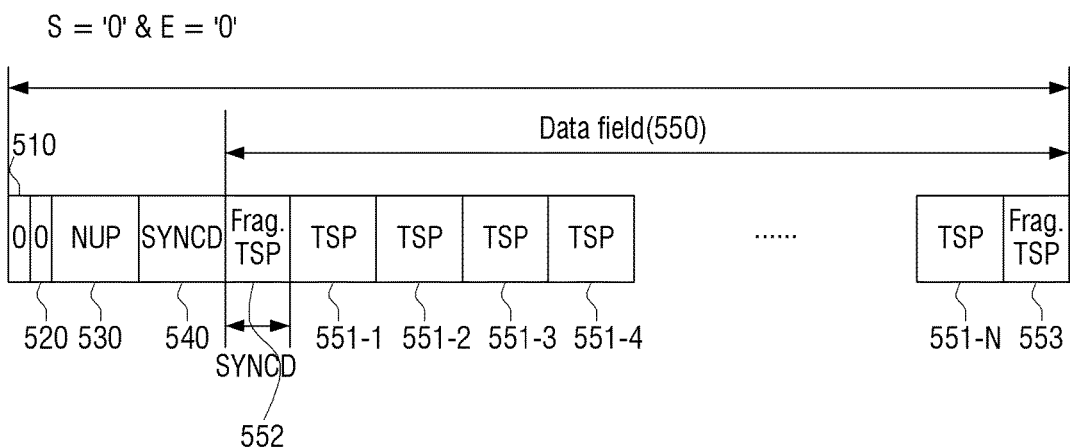
FIGS. 5A and 5B are diagrams for explanation of an example of a frame format according to an exemplary embodiment of the present disclosure.
Figure 5B:
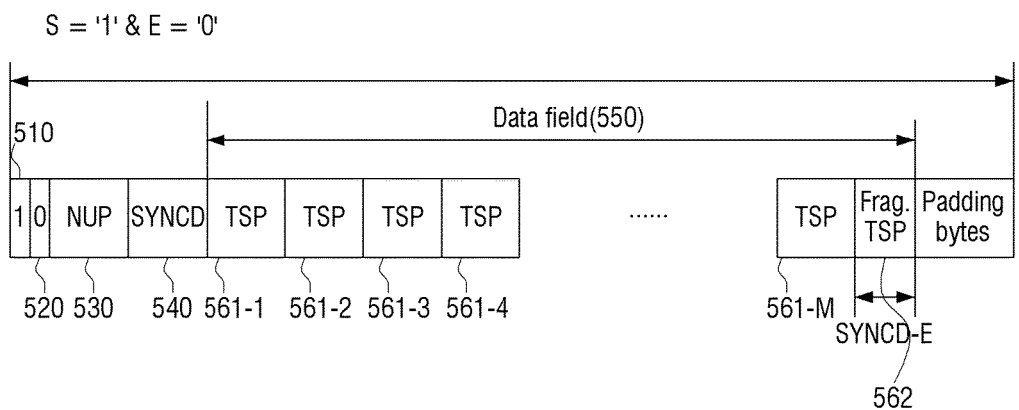

FIGS. 5A and 5B are diagrams for explanation of an example of a frame format according to an exemplary embodiment of the present disclosure.

FIG. 5A illustrates the frame format when a start indicator S 510 is "0", an end indicator E 520 is "0", and a number of user packets NUP 530 is "N" according to an exemplary embodiment of the present disclosure.

Referring to FIG. 5A, complete packets included in a data field 550 are N packets 551-1 to 551-N. Fragmented data packets 552 and 553 are distributed in a front end and a rear end of the data field 550, respectively. In this case, a SYNCD 540 indicates LSYNCD-S as a distance between the start byte of the data field and an end byte of a second data packet, a start byte of second data packet is included in the data field.

FIG. 5B illustrates the frame format when the start indicator S 510 is "1", the end indicator E 520 is "0", and the number of user packets NUP 530 is "M" according to an exemplary embodiment of the present disclosure.

Referring to FIG. 5B, complete packets included in the data field 550 are M packets 561-1 to 561-M. A fragmented data packet 562 is disposed in a rear end of the data field 550. In this case, the SYNCD 540 indicates LSYNCD-E as a distance between the end byte of the data field and an end byte of a data packet which is included in the data field.

Figure 6:
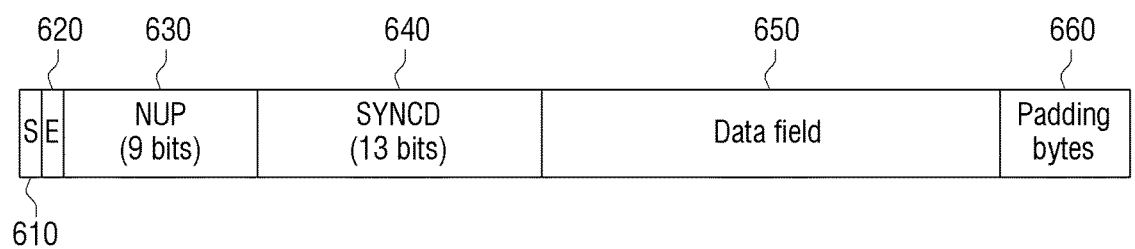
FIG. 6 is a diagram illustrating a frame format according to another exemplary embodiment of the present disclosure.

FIG. 6 is a diagram illustrating a frame format according to another exemplary embodiment of the present disclosure.

FIG. 6 illustrates a case in which a data packet length varies, for example, a case of GSE packet.

In case of GSE packet, the GSE packet has a variable length, and thus, the frame format of FIG. 6 has a different structure from the frame format having a fixed length illustrated in FIG. 4. That is, at least one information may have a different bit number from the structure illustrated in FIG. 4.

In detail, although a start indicator S 610 and an end indicator E 620 may represent in the same bit number and the same state as in FIG. 4, a number of user packets (NUP) 630, and an SYNCD 640 may have different bit numbers from in FIG. 4.

For example, the SYNCD 640 is information indicating a distance between the start byte of the data field and a start byte of a second data packet, when the start byte of the first data packet is not included in the data field, the start byte of the second data packet is included in the data field. The SYNCD 640 may also indicate a distance between the end byte of the data field and the end byte of the last data packet among data packets, when the start byte of the first data packet is included in the data field, the end byte of the last data packet is included in the data field. In addition, the SYNCD 440 does not exceed the maximum data packet length when the data packet length is fixed, and thus, a bit number is required to represent the data packet length. For example, on the assumption that that data packet length has a maximum data field length value, the SYNCD 640 may be represented in 8100 bytes, that is, 13 bits indicating the number up to 213. Thus, on the assumption that a header has 3 bytes, the number of user packets (NUP) 630 may be represented in 9 bits as illustrated in FIG. 6.

For example, on the assumption that a length of a BB frame is 64800 bits and a coding rate 14/15 is applied, a maximum length of the data field is 64800*14/15 and a maximum packet number represented in 9 bits is 512, and thus, the packet length is 64800*14/15*1/512. When the packet length is converted in units of bytes, a packet length of about 15.82 may be obtained according to Equation 1 below. That is, an average packet length of GSE may be about 16 bytes.

$$64800 * \frac{14}{15} * \frac{1}{512} * \frac{1}{8} = 15.82 \qquad \text{[Equation 1]}$$

However, the packet length according to Equation 1 above refers to an average packet length. Needless to say, the packet length of GSE may be less than 15.82 bytes.

In the aforementioned exemplary embodiments, for convenience of description, calculation is performed except for a byte number of a header, an FEC BCH code byte number, and so on.

Figure 7:
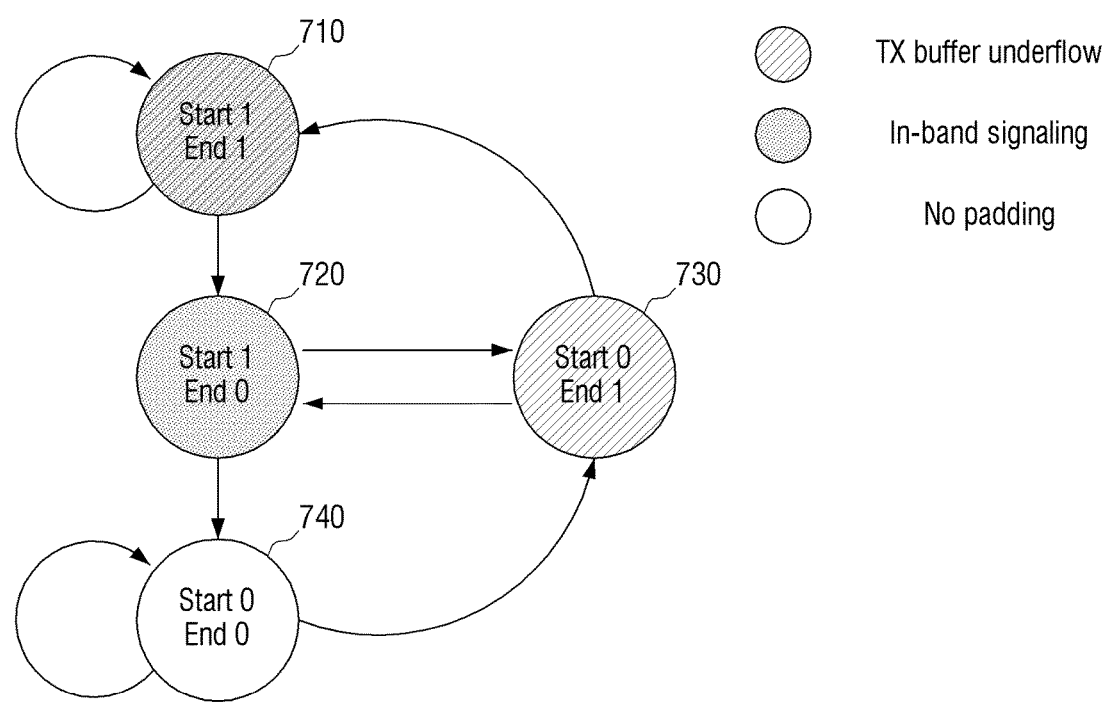
FIG. 7 is a diagram for explanation of a mechanism of a frame format according to an exemplary embodiment of the present disclosure.

FIG. 7 is a diagram for explanation of a mechanism of a frame format according to an exemplary embodiment of the present disclosure.

In FIG. 7, it is assumed that, when sufficient data is not collected in a buffer, a first BB frame is generated and the corresponding BB frame includes in-band signaling. This case is a case 710 in which a start indicator S and an end indicator E are each 1

Then, the BB frame corresponds to a case 710 in which the start indicator S and the end indicator E are each 1 or a case 720 in which the start indicator S and the end indicator E are 1 and 0, respectively.

When the start indicator S and the end indicator E are 1 and 0, respectively (720), a next BB frame may corresponds to a case 730 in which the start indicator S and the end indicator E are 0 and 1, respectively, or a case 740 in which the start indicator S and the end indicator E are 0 and 0, respectively.

Other cases would be understood with reference to the drawings, and thus, a detailed description thereof is not given.

Figure 8:
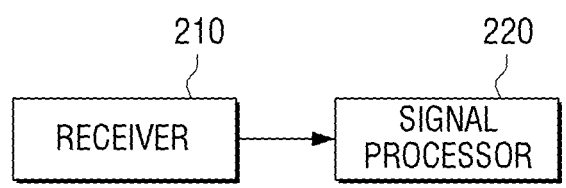
FIG. 8 is a block diagram illustrating the configuration of a receiving apparatus according to an exemplary embodiment of the present disclosure.

FIG. 8 is a block diagram illustrating the configuration of a receiving apparatus 200 according to an exemplary embodiment of the present disclosure.

Referring to FIG. 8, the receiving apparatus 200 may include a receiver 210 and a signal processor 220.

The receiver 210 receives data transmitted from the transmitting apparatus 100 illustrated in FIGS. 2A and 2B. Here, the receiver 210 may be implemented as a tuner.

In detail, the receiver 210 may receive a frame into which a header is inserted. Here, the header includes at least one data packet and information associated with a data field occupied by at least one data packet.

The signal processor 220 may calculate the length of the data field including a data packet based on the information included in the header and process a frame based on the calculated length.

Here, the information associated with the data field may include first information indicating whether a start byte of a first data packet is included in the data field and second information indicating whether an end byte of a last data packet is included in the data field.

In this case, when it is determined that a start byte of a first data packet is not included in the data field and an end byte of a last data packet is not included in the data field based on the first information and the second information, the signal processor 220 may calculate a difference between a length of the frame and a header region length as a data field length. For example, the start indicator S 410 and the end indicator E 420 illustrated in FIG. 4 may each be 0.

In the case where the start indicator S 410 and the end indicator E 420 illustrated in FIG. 4 are each 0, it is deemed that a region except for a header is filled with a data packet. Thus, the data field length may be calculated as a value obtained by subtracting the header region length from the length of the frame.

In addition, the information associated with the data field may further include third information indicating the number of data packets, an end byte of the data packets is included in the data field.

In this case, when it is determined that a start byte of a first data packet is included in the data field and an end byte of a last data packet is included in the data field based on the first information and the second information, the signal processor 220 may calculate a value obtained by multiplying the third information and the data packet length as a data field length. For example, the start indicator S 410 and the end indicator E 420 illustrated in FIG. 4 may each be 1.

In the case where the start indicator S 410 and the end indicator E 420 illustrated in FIG. 4 are each 1, a first data packet included in the data field is a complete data packet and an end byte of a last packet is in the data field, and thus, it is deemed that only complete data packets are included in the data field. Thus, the data field length may be calculated by multiplying the number of data packets included in the data field and that data packet length.

In addition, the information associated with the data field may further include first distance information indicating a distance between the start byte of the data field and a start byte of a second data packet, when the start byte of the first data packet is not included in the data field, the start byte of the second data packet is included in the data field.

In this case, when it is determined that a start byte of a first data packet is not included in the data field and an end byte of a last data packet is included in the data field based on the first information and the second information, the signal processor 220 may be calculate a value obtained by summing the first distance information and a value obtained by multiplying a value obtained by reducing 1 from the third information and the data packet length, as the data field length. For example, the start indicator S 410 and the end indicator E 420 illustrated in FIG. 4 may each be 0 and 1.

In the case where the start indicator S 410 is 0 and the end indicator E 420 is 1, it is deemed that an incomplete data packet is included in a start byte of the data field. Thus, a value obtained by summing the first distance information indicating a length of the first complete data packet and a value obtained by multiplying the number of data packets that are completely included in that data field and the data packet length may be calculated as the data field length.

In addition, the information associated with the data field may further include second distance information indicating a distance between the end byte of the data field and the end byte of the last data packet among data packets, when the start byte of the first data packet is included in the data field, the end byte of the data packets is included in the data field.

In this case, when it is determined that a start byte of a first data packet is included in the data field and an end byte of a last data packet is not included in the data field based on the first information and the second information, the signal processor 220 may calculate a value obtained by summing the second distance information and a value obtained by multiplying the third information and the data packet length, as the data field length. For example, the start indicator S 410 and the end indicator E 420 illustrated in FIG. 4 may be 1 and 0, respectively.

In the case where the start indicator S 410 is 1 and the end indicator E 420 is 0, the first data packet included in the data field is a complete packet and the last data packet is an incomplete data packet, and thus, a value obtained by summing the second distance information indicating the length of the last incomplete data packet length and a value obtained by multiplying the data packet length and the number of data packets that are completely included in that data field, as the data field length.

Figure 9A:
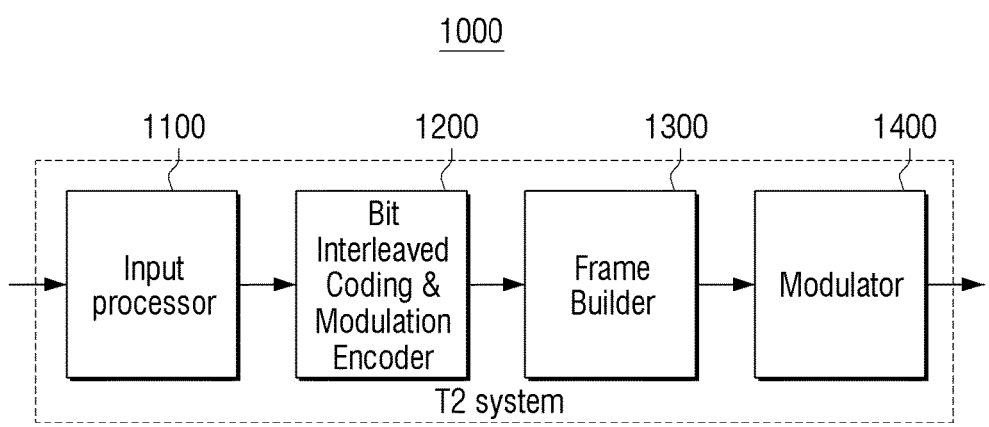
FIGS. 9A and 9B are block diagrams illustrating configurations of a DVB-T2 system.
Figure 9B:
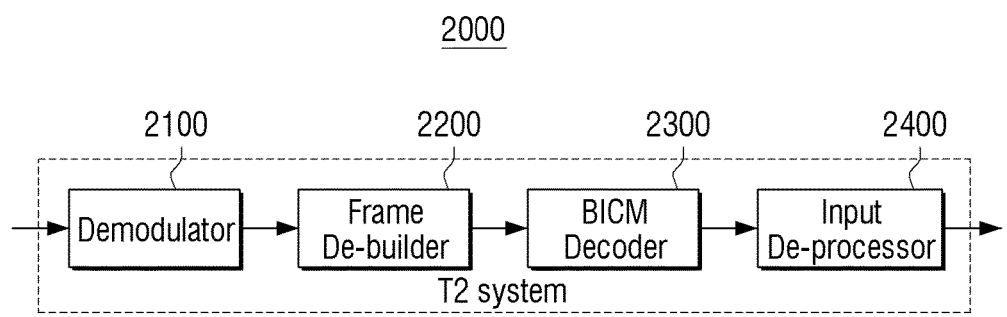

FIGS. 9A and 9B are block diagrams illustrating the configuration of a DVB-T2 system. In particular, FIG. 9A is a block diagram for explanation of a DVB-T2 transmitting system 1000 and FIG. 9B is a block diagram for explanation of a DVB-T2 receiving system 2000.

Referring to FIG. 9A, the DVB-T2 transmitting system 1000 may include an input processor 1100, a BICM encoder 1200, a frame builder 1300, and a modulator 1400.

The DVB-T2 transmitting system 1000 is the same as in the system defined in DVB-T2 that is one European digital broadcast standard, and thus, detailed components thereof will be schematically described. For a detailed description thereof, refer to the "Digital Video Broadcasting (DVB); Frame structure channel coding and modulation for a second generation digital terrestrial television broadcasting system (DVB-T2)".

The input processor 1100 generates a baseband (BB) frame from an input stream of data to be served. Here, the input stream may be a transport stream (MPEG-2 TS), a generic stream (GS), or the like.

The BCIM encoder 1200 may determine an FEC coding rate and a constellation order according to a fixed PHY frame or a mobile PHY frame, to which the data to be served is to be transmitted, and encode the data. In addition, the BCIM encoder 1200 may also encode signaling information of the data to be served.

The frame builder 1300 and the modulator 1400 determines an OFDM parameter for a signaling region and an OFDM parameter of a region to which the data to be served is to be transmitted to constitute a frame, and adds a sink region the frame to generate a frame. In addition, modulation is performed to convert the generated frame into a radio frequency (RF) signal, and the RF signal is transmitted to a receiver.

In this case, information indicating whether a received frame is a mobile frame or a fixed frame is inserted into the sink region. When an OFDM parameter of a data region or a signaling region of each frame is not predetermined, information indicating the OFDM parameter of the data region or the signaling region of each frame is stored in the sink region and transmitted.

According to exemplary embodiments of the present disclosure, frame generation performed by the transmitting apparatus 100 described with reference to FIGS. 2A and B may be performed by the input processor 1100.

Referring to FIG. 9B, the DVB-T2 receiving system 2000 may include a demodulator 2100, a frame de-builder 2200, a BICM decoder 2300, and an input de-processor 2400.

The demodulator 2100 performs demodulation based on the OFDM parameter from the received RF signal and performs sink detection. When the demodulator 2100 detects a sink, the demodulator 2100 recognizes whether a mobile frame or a fixed frame is received from the information stored in the sink region.

In this case, when the OFDM parameter of the data region and the signaling region is not predetermined, the demodulator 2100 may acquire the OFDM parameter of the data region and the signaling region, stored in the sink region, acquire an OFDM parameter of a data region and a signaling region subsequent to the sink region, and perform demodulation.

The frame de-builder 2200 inputs the demodulated data of the signaling region to the BCIM decoder 2300 of the signaling region.

The BCIM decoder 2300 demodulates the received data. In this case, the BCIM decoder 2300 may acquire parameters regarding an FEC method, a demodulation method, and so on from data stored in each data region using the signaling information, and perform BCIM demodulation.

The input de-processor 2400 may process a BB frame input from the BCIM decoder 2300 to generate the data to be served.

According to the aforementioned exemplary embodiments, on the assumption that the DVB-T2 receiving system 2000 knows data of a service desired by a user, an operation of the DVB-T2 receiving system 2000 has been described. However, alternatively, when the DVB-T2 receiving system 2000 does not know the data of the service desired by the user, as a process of recognizing the data of the service desired by the user by the DVB-T2 receiving system 2000, the user fix TV Channel, and the DVB-T2 receiving system 2000 may receive the frame via the same process of the aforementioned frame receiving process and acquire service information (PSI/SI or PSIP) stored in the frame to know service data regarding Channel 6.

Processes of the receiving apparatus 200 described with reference to FIG. 8 may be performed by the input de-processor 2400.

Figure 10:
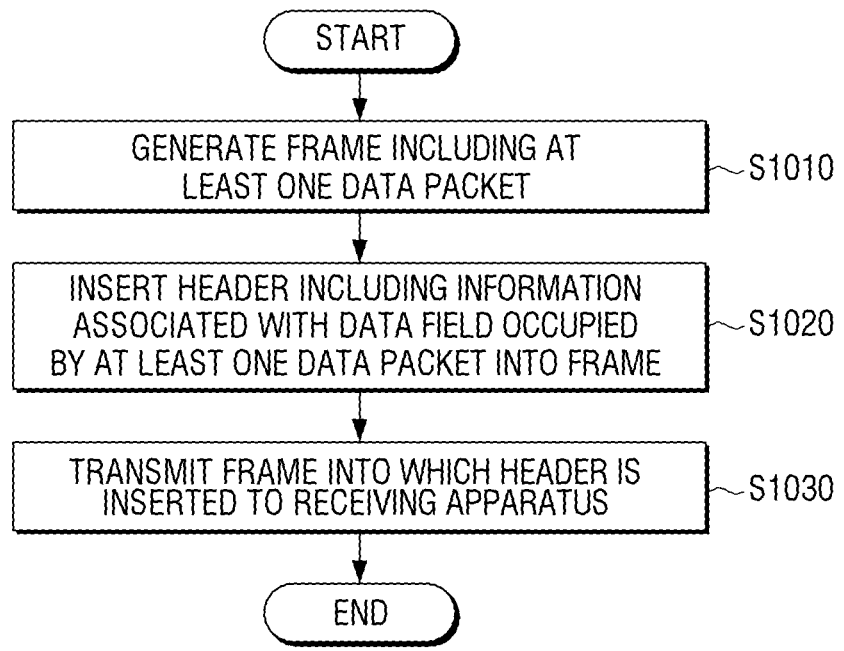
FIG. 10 is a flowchart for explanation of a data processing method of a transmitting apparatus according to an exemplary embodiment of the present disclosure.

FIG. 10 is a flowchart for explanation of a data processing method of a transmitting apparatus according to an exemplary embodiment of the present disclosure.

In the data processing method of the transmitting apparatus of FIG. 10, first, a frame including at least one data packet is generated (S1010).

Then, a header including information associated with a data field occupied with at least one data packet is inserted into the generated frame (S1020). Here, the information associated with the data field may include first information indicating whether a start byte of a first data packet is included in the data field and second information indicating whether an end byte of a last data packet is included in the data field. In this case, the first information and the second information may be flag values of 0 or 1.

Then, the frame into which the header is inserted is transmitted to the receiving apparatus (S1030).

In addition, the information associated with the data field may further include third information indicating the number of data packets, an end byte of which is included in the data field.

In addition, the information associated with the data field may further include first distance information indicating a distance between the start byte of the data field and a start byte of a second data packet, when the start byte of the first data packet is not included in the data field, the start byte of the second data packet is included in the data field.

In addition, the information associated with the data field may further include second distance information indicating a distance between the end byte of the data field and the end byte of the last data packet among data packets, when the start byte of the first data packet is included in the data field, the end byte of the data packets is included in the data field.

Figure 11:
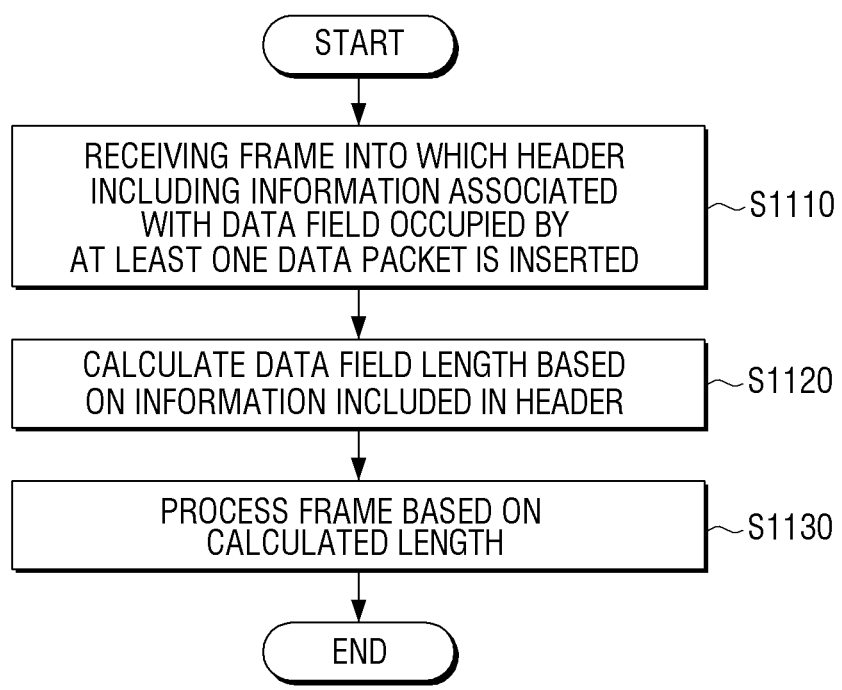
FIG. 11 is a flowchart for explanation of a data processing method of a receiving apparatus according to another exemplary embodiment of the present disclosure.

FIG. 11 is a flowchart for explanation of a data processing method of a receiving apparatus according to another exemplary embodiment of the present disclosure.

In the data processing method of the receiving apparatus of FIG. 11 of receiving and processing a frame including at least one data packet, first, the receiving apparatus receives a frame into which a header including information associated with a data field occupied with at least one data packet is inserted (S1110). Here, the information associated with the data field may include first information indicating whether a start byte of a first data packet is included in the data field and second information indicating whether an end byte of a last data packet is included in the data field.

Then, a data field length is calculated based on the information associated with the data field inserted into the header (S1120).

Then, the frame is processed based on the calculated data field length from operation S1120 (S1130).

In operation S1120 for calculating the data field length, it is determined that a start byte of a first data packet is not included in the data field and an end byte of a last data packet is not included in the data field based on the first information and the second information, a difference between a length of the frame and a header region length may be calculated as a data field length.

In addition, the information associated with the data field may further include third information indicating the number of data packets, an end byte of which is included in the data field.

In this case, when it is determined that a start byte of a first data packet is included in the data field and an end byte of a last data packet is included in the data field based on the first information and the second information, a value obtained by multiplying the third information and the data packet length may be calculated as a data field length.

In addition, the information associated with the data field may further include third information indicating the number of data packets, an end byte of the data packets is included in the data field, and first distance information indicating a distance between the start byte of the data field and a start byte of a second data packet, when the start byte of the first data packet is not included in the data field, the start byte of the second data packet is included in the data field.

In operation S1120 for calculating the data field length, when it is determined that a start byte of a first data packet is not included in the data field and an end byte of a last data packet is included in the data field based on the first information and the second information, a value obtained by summing the first distance information and a value obtained by multiplying a value obtained by reducing 1 from the third information and the data packet length may be calculated as a data field length.

In addition, the information associated with the data field may further include third information indicating the number of data packets, an end byte of the data packets is included in the data field, and second distance information indicating a distance between the end byte of the data field and the end byte of the last data packet among data packets, when the start byte of the first data packet is included in the data field, the end byte of the last data packet is included in the data field.

In operation S1120 for calculating the data field length, when it is determined that a start byte of a first data packet is included in the data field and an end byte of a last data packet is not included in the data field based on the first information and the second information, a value obtained by summing the second distance information and a value obtained by multiplying the third information and the data packet length may be calculated as a data field length.

As described above, according to the exemplary embodiments of the present disclosure, minimum additional information instead of an actual data packet may be inserted into a BB frame to increase data transmission efficiency. For example, in case of a transmission stream, according to a conventional BB frame structure, a 3-byte header is required. However, according to the exemplary embodiments of the present disclosure, a 2-byte header is sufficient. In addition, in case of GSE stream, according to a conventional BB frame structure, a 4-byte header is required. However, according to the exemplary embodiments of the present disclosure, a 3-byte header is sufficient.

According to the exemplary embodiments of the present disclosure, data processing methods of a transmitting apparatus and a receiving apparatus may be implemented as a program code executable by a computer and provided to a transmitting apparatus so as to be executed by a processor while being stored in various non-transitory computer readable media.

For example, a non-transitory computer readable medium that generates a frame including at least one data packet and stores a program for inserting a header including information associated with a data field occupied by at least one data packet into a frame may be provided to the transmitting apparatus.

The non-transitory computer readable medium is not a medium that stores data for a short period of time, such as register, a cache, a memory, and so on and is a medium that semi-permanently stores data and from which data is readable by a device. In detail, the aforementioned applications or programs may be provide while being stored in the non-transitory computer readable medium such as a CD, a DVD, a hard disc, a blu-ray disc, a USB, a memory card, an ROM, and so on.

The foregoing exemplary embodiments and advantages are merely exemplary and are not to be construed as limiting the present disclosure. The present teaching can be readily applied to other types of apparatuses. Also, the description of the exemplary embodiments of the present disclosure is intended to be illustrative, and not to limit the scope of the claims, and many alternatives, modifications, and variations will be apparent to those skilled in the art.

What is claimed is:

1. A data processing method of a transmitting apparatus, the data processing method comprising:
   building a frame including a payload and a header based on input packets; and
   transmitting the frame,
   wherein the header comprises information related to the payload, and
   wherein the information comprises,
   first information indicating whether a first packet of the payload comprises a start byte of a first input packet among the input packets,
   second information indicating whether a last packet of the payload comprises an end byte of a last input packet among the input packets, and
   third information indicating a number of input packets of each of which an end byte is included in the payload.

2. The data processing method as claimed in claim 1, wherein if the start byte of the first input packet is not included in the first packet of the payload, the information comprises fourth information,
   wherein the fourth information comprises a distance between a start byte of the payload and a start byte of a second packet of the payload, and
   wherein the start byte of the second packet is included in the payload.

3. The data processing method as claimed in claim 1, wherein if the start byte of the first input packet is included in the first packet of the payload, and the information comprises fifth information, and
   wherein the fourth information comprises a distance between an end byte of the payload and an end byte of a last input packet among the in packets of each of which the end byte is included in the payload.

4. The data processing method as claimed in claim 1, wherein the first information is a flag value of 1 or 0 and the second information is a flag value of 1 or 0.

5. A data processing method of a receiving apparatus for receiving and processing a frame comprising at least one packet, the data processing method comprising:
   receiving a frame including a payload and a header, the header comprising information related to the payload;
   calculating a length of the payload based on the information; and processing the frame based on the length of the payload,
wherein the frame is generated based on input packets, and
wherein the information comprises
first information indicating whether a first packet of the payload comprises a start byte of a first input packet among the input packets,
second information indicating whether a last packet of the payload comprises an end byte of a last input packet among the input packets, and
third information indicating a number of input packets of each of which an end byte is included in the payload.

6. The data processing method as claimed in claim 5, wherein if the first information indicates that the start byte of the first input packet is not included in the first packet of the payload, and the second information indicates that the end byte of the last input packet is not included in the last packet of the payload, the calculating of the length of the payload comprises calculating a difference between a length of the frame and a header region length.

7. The data processing method as claimed in claim 5, wherein if the first information indicates that the start byte of the first input packet is included in the first packet of the payload and the second information indicating that the end byte of the last input packet is included in the last packet of the payload, the calculating the length of the payload comprises calculating a value obtained by multiplying the third information and a packet length.

8. The data processing method as claimed in claim 5, wherein:
wherein if the start byte of the first input packet is not comprised in the first packet of the payload, the information comprises fourth information,
wherein the fourth information comprises a distance between a start byte of the payload and a start byte of a second packet of the payload,
wherein the start byte of the second packet is included in the payload,
wherein if the first information indicates that the start byte of the first input packet is not included in the payload and the second information indicates that the end byte of the last input packet is included in the last packet of the payload, the calculating the length of the payload comprises summing the fourth information with a first value, and
wherein the first value is obtained by multiplying the packet length with a value that is obtained by reducing the third information by 1.

9. The data processing method as claimed in claim 5, wherein if the start byte of the first input packet is included in the first packet of the payload, and the information comprises fifth information,
wherein the fifth information comprises a distance between an end byte of the payload and an end byte of a last input packet among the input packets of each of which the end byte is included in the payload,
wherein if the first information indicates that the start byte of the first input packet is included in the first packet of the payload, and the second information indicates that the end byte of the last input packet is not included in the last packet of the payload, the calculating of the payload length comprises summing the fourth information with a first value, and
wherein the first value is obtained by multiplying the third information and the packet length.

10. A transmitting apparatus comprising:
circuitry configured to build a frame a payload and a header based on input packets; and
a transmitter configured to transmit the frame,
wherein the header comprises information related to the payload, and
wherein the information comprises,
first information indicating whether a first packet of the payload comprises a start byte of a first input packet among the input packets,
second information indicating whether a last packet of the payload comprises an end byte of a last input packet among the input packets, and
third information indicating a number of input packets of each of which an end byte is included in the payload.

11. The transmitting apparatus as claimed in claim 10, wherein if the start byte of the first input packet is not included in the first packet of the payload, the information comprises fourth information,
wherein the fourth information comprises a distance between a start byte of the payload and a start byte of a second packet of the payload, and
wherein the start byte of the second packet is included in the payload.

12. The transmitting apparatus as claimed in claim 10, wherein if the start byte of the first input packet is included in the first packet of the payload, and the information comprises fifth information, and
wherein the fourth information comprises a distance between an end byte of the payload and an end byte of a last input packet among the input packets of each of which the end byte is included in the payload.

13. The transmitting apparatus as claimed in claim 10, wherein the first information is a flag value of 1 or 0 and the second information is a flag value of 1 or 0.

14. A receiving apparatus for receiving and processing a frame comprising at least one packet, the receiving apparatus comprising:
a receiver configured to receive a frame comprising a header and a payload, the header comprising information related to the payload; and
a signal processor configured to calculate a payload length based on the information and to process the frame based on the calculated payload length,
wherein the frame is generated based on input packets, and
wherein the information comprises
first information indicating whether first packet of the payload comprises a start byte of a first input packet among the input packets,
second information indicating whether a last packet of the payload comprises an end byte of a last input packet among the input packets, and
third information indicating a number of input packets of each of which an end byte is included in the payload.

15. The receiving apparatus as claimed in claim 14, wherein if the first information indicates that the start byte of the first input packet is not included in the first packet of the payload, and the second information indicates that the end byte of the last input packet is not included in the last packet of the payload, the calculating of the length of the payload comprises calculating a difference between a length of the frame and a header region length.

16. The receiving apparatus as claimed in claim 15, wherein if the first information indicates that the start byte of the first input packet is included in the first packet of the payload and the second information indicating that the end byte of the last input packet is included in the last packet of the payload, the calculating the length of the payload comprises calculating a value obtained by multiplying the third information and a packet length.

17. The receiving apparatus as claimed in claim 14, wherein if the start byte of the first input packet is not comprised in the first packet of the payload, the information comprises fourth information, wherein the fourth information comprises a distance between a start byte of the payload and a start byte of a second packet of the payload, wherein the start byte of the second packet is included in the payload, wherein if the first information indicates that the start byte of the first input packet is not included in the payload and the second information indicates that the end byte of the last input packet is included in the last packet of the payload, the calculating the length of the payload comprises summing the fourth information with a first value, and wherein the first value is obtained by multiplying the packet length with a value that is obtained by reducing the third information by 1.

18. The receiving apparatus as claimed in claim 14, wherein if the start byte of the first input packet is included in the first packet of the payload, and the information comprises fifth information, wherein the fifth information comprises a distance between an end byte of the payload and an end byte of a last input packet among the input packets of each of which the end byte is included in the payload, wherein if the first information indicates that the start byte of the first input packet is included in the first packet of the payload, and the second information indicates that the end byte of the last input packet is not included in the last packet of the payload, the calculating of the payload length comprises summing the fourth information with a first value, and wherein the first value is obtained by multiplying the third information and the packet length.

* * * * *